(12) United States Patent
Bax et al.

(10) Patent No.: US 9,922,361 B2
(45) Date of Patent: Mar. 20, 2018

(54) CONTENT SUGGESTIONS

(71) Applicant: Yahoo!, Inc., Sunnyvale, CA (US)

(72) Inventors: Eric Bax, Altadena, CA (US); Arun Autuchirayll, Burbank, CA (US); John Peng, Burbank, CA (US); Roxana Iuliana Marcu Forbes, Encino, CA (US)

(73) Assignee: EXCALIBUR IP, LLC, New York, NY (US)

(*) Notice: Subject to any disclaimer, the term of this patent is extended or adjusted under 35 U.S.C. 154(b) by 390 days.

(21) Appl. No.: 14/462,483

(22) Filed: Aug. 18, 2014

(65) Prior Publication Data

US 2016/0048901 A1    Feb. 18, 2016

(51) Int. Cl.
*G06F 17/30* (2006.01)
*G06Q 30/06* (2012.01)

(52) U.S. Cl.
CPC ..... *G06Q 30/0631* (2013.01); *G06F 17/3097* (2013.01); *G06F 17/30867* (2013.01); *G06Q 30/0625* (2013.01)

(58) Field of Classification Search
CPC ................................................ G06F 17/30321
USPC .................................................. 707/765, 746
See application file for complete search history.

(56) References Cited

U.S. PATENT DOCUMENTS

| | | | | |
|---|---|---|---|---|
| 6,876,997 B1* | 4/2005 | Rorex | ............... | G06F 17/30864 707/3 |
| 2008/0168032 A1* | 7/2008 | Criou | ................ | G06F 17/30675 707/3 |
| 2013/0198158 A1* | 8/2013 | Tijssen | .............. | G06F 17/30882 707/706 |
| 2015/0120753 A1* | 4/2015 | Wang | ................ | G06F 17/30321 707/746 |

* cited by examiner

*Primary Examiner* — Chelcie Daye
(74) *Attorney, Agent, or Firm* — Cooper Legal Group, LLC (57) ABSTRACT

Users may create and/or interact with content that may reference various businesses. For example, a user may submit a search query "Akron Hardware Store" to a search interface that may provide relevant search results for the search query. As provided herein, content suggestions may be provided to the user based upon an occurrence of a business reference of a business. For example, search keywords that resulted in user engagement with the business may be evaluated to identify a set of search keywords (e.g., search queries that led users to an Akron Hardware Store website). A set of content suggestions (e.g., coupons, maps, search queries, website links, images, descriptions, etc.) may be generated based upon the set of search keywords, and may be provided to the user.

20 Claims, 10 Drawing Sheets

CONTENT SUGGESTIONS

BACKGROUND

Many users perform tasks through applications and/or websites. Such tasks may involve various businesses that may be of interest to users. In an example, a user may submit a search query "Akron Renovation Store", corresponding to a local business that the user may desire to visit to purchase home renovation supplies for a kitchen project, to a search engine. The search engine may return a search results page populated with various websites that may have a high correlation to the search query. Unfortunately, many computing devices and/or computing environments may lack user task intent technology that may otherwise direct the user to particular items (e.g., popular and/or trending merchandise items sold by the Akron Renovation Store) that may aid the user in efficiently performing the kitchen renovation supply research task. Thus, the user may visit a search result, such as an Akron Renovation Store website, and may spend substantial amounts of time searching for items within the Akron Renovation Store website that may be relevant and/or interesting to the user.

SUMMARY

In accordance with the present disclosure, one or more systems and/or methods for providing content suggestions are provided. An occurrence of a business reference, of a business, associated with a user may be identified. For example, a business name may be identified within an email, a chat message, a social network post, a question and/or answer associated with a question and answer service, a search query, etc. as the business reference. Search keywords that resulted in user engagement with the business may be evaluated to identify a set of search keywords having user engagement above a threshold. For example, one or more search keywords may be identified for inclusion within the set of search keywords based upon a temporal threshold defined based upon a business feature of the business or a search keyword feature of a search keyword.

A set of content suggestions are generated based upon the set of search keywords. In an example, one or more content suggestions may be identified for inclusion within the set of content suggestions based upon a user demographic of a user (e.g., an age of the user), a location of the user, a user interest of the user, a browsing history of the user, a purchase history of the user, a social network profile of the user, a preference of the user, etc. In an example, content suggestions may be ordered based upon an advertising revenue opportunity, a user dwell time, a click through rate, a popularity metric, a trending metric, a user engagement metric, a financial metric, or other metric. The set of content suggestions may comprise a website link to a merchandise item, a search query linking to a search query results interface, an image of the merchandise item, a description of the merchandise item, a map to a location of the merchandise item, a coupon, an advertisement, a brand keyword, a merchandise keyword, a merchandise category, a user review for the merchandise item, a business user review, a business description, etc.

The set of content suggestions may be provided to the user. For example, the set of content suggestions may be displayed through a search result interface, an email interface, a social network interface, a chat message interface, etc. In an example, the set of content suggestions may be displayed through a suggestion interface. The suggestion interface may be populated with a save content suggestion interface element for saving a content suggestion, a share content suggestion interface element for sharing a content suggestion with a second user, a post to social network content suggestion interface element for posting a content suggestion to a social network profile of the user, etc. In an example, the set of content suggestions are displayed through a suggestion interface displayed with a first webpage. Responsive to selection of a content suggestion, a current user interface is transitioned from the first webpage to a second webpage corresponding to the content suggestion. The suggestion interface be displayed with the second webpage.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
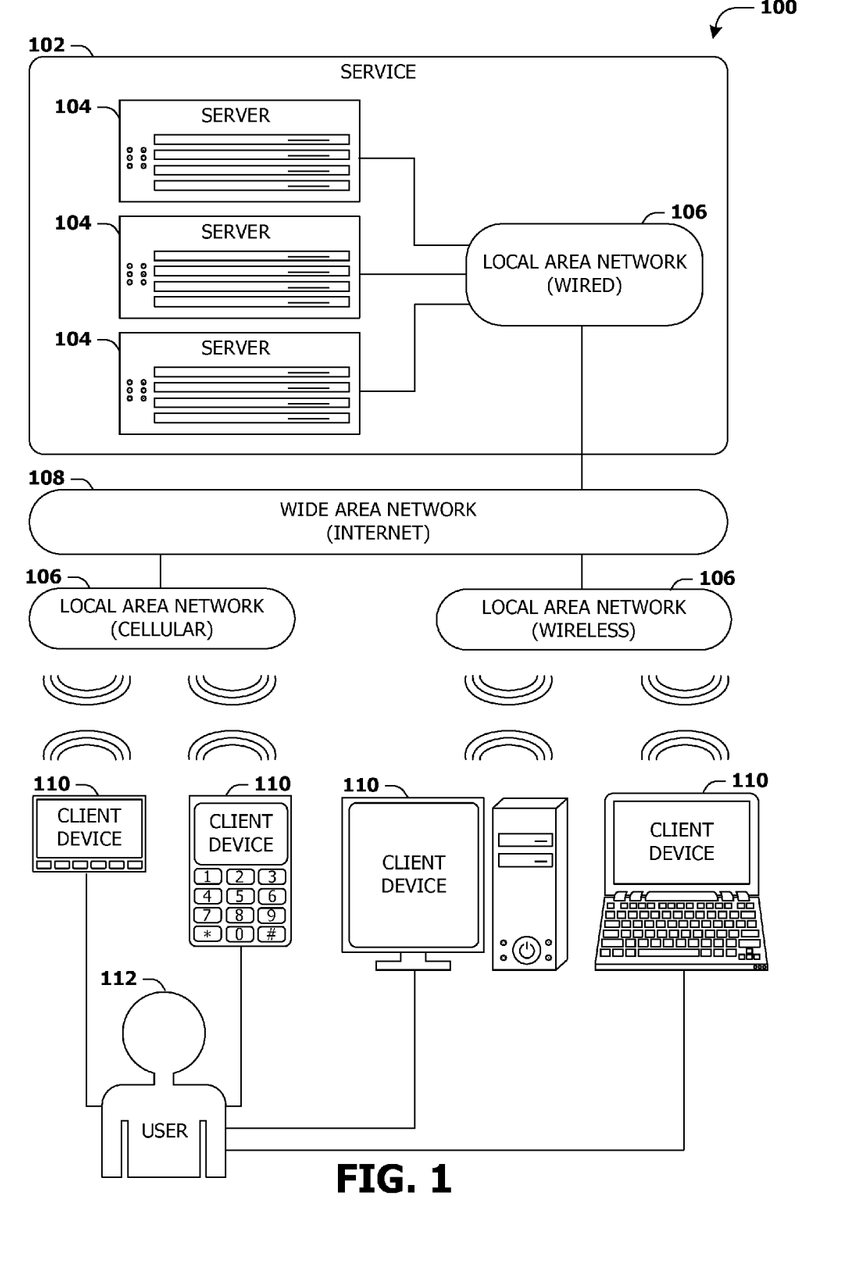
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
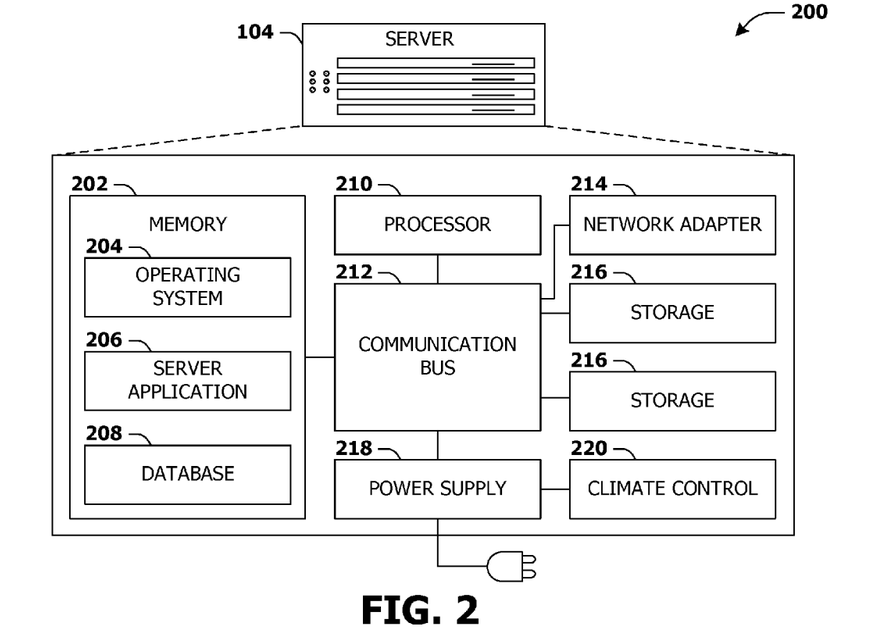
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
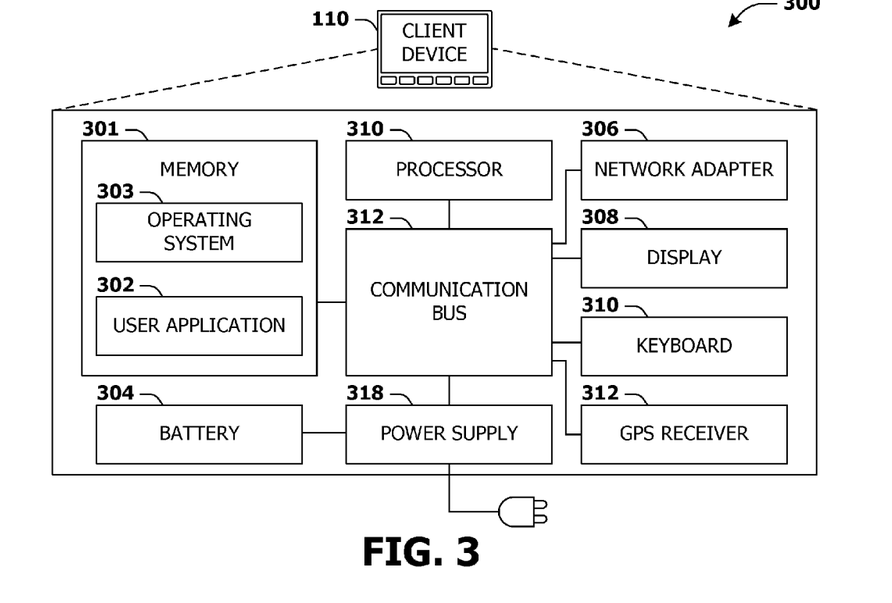
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 210 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 310, a mouse, a microphone, a camera, and/or a touch-sensitive component of the display 308; and/or environmental sensors, such as a global positioning system (GPS) receiver 312 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

1. Presented Techniques

One or more systems and/or techniques for providing content suggestions are provided herein. Many computing devices and/or environments may lack computing resources, detection techniques, and/or functionality to determine what content, such as merchandise items, with which a user may be interested. As provided herein, content suggestions may be provided to a user based upon search keywords that result in other users engaging with a business. For example, a user may submit a search query "the Florida Keys Hardware Store." Search keywords that led other users to access a Florida Keys Hardware Store website (e.g., popular and/or trending keywords, such as bug spray, paint roller, mower, etc.) may be used to generate a set of content suggestions that may be provided to the user (e.g., a popular bug spray, a highly rated paint roller, etc.). The ability to provide users with content suggestions may reduce network bandwidth, time, and/or computing resources otherwise utilized by users in an attempt to locate such content on their own (e.g., manually searching the Florida Keys Hardware Store through trial and error). Many content providers may not have information, processing resources, and/or network bandwidth to leverage search keywords, used by other users, to engage in such content.

Figure 4:
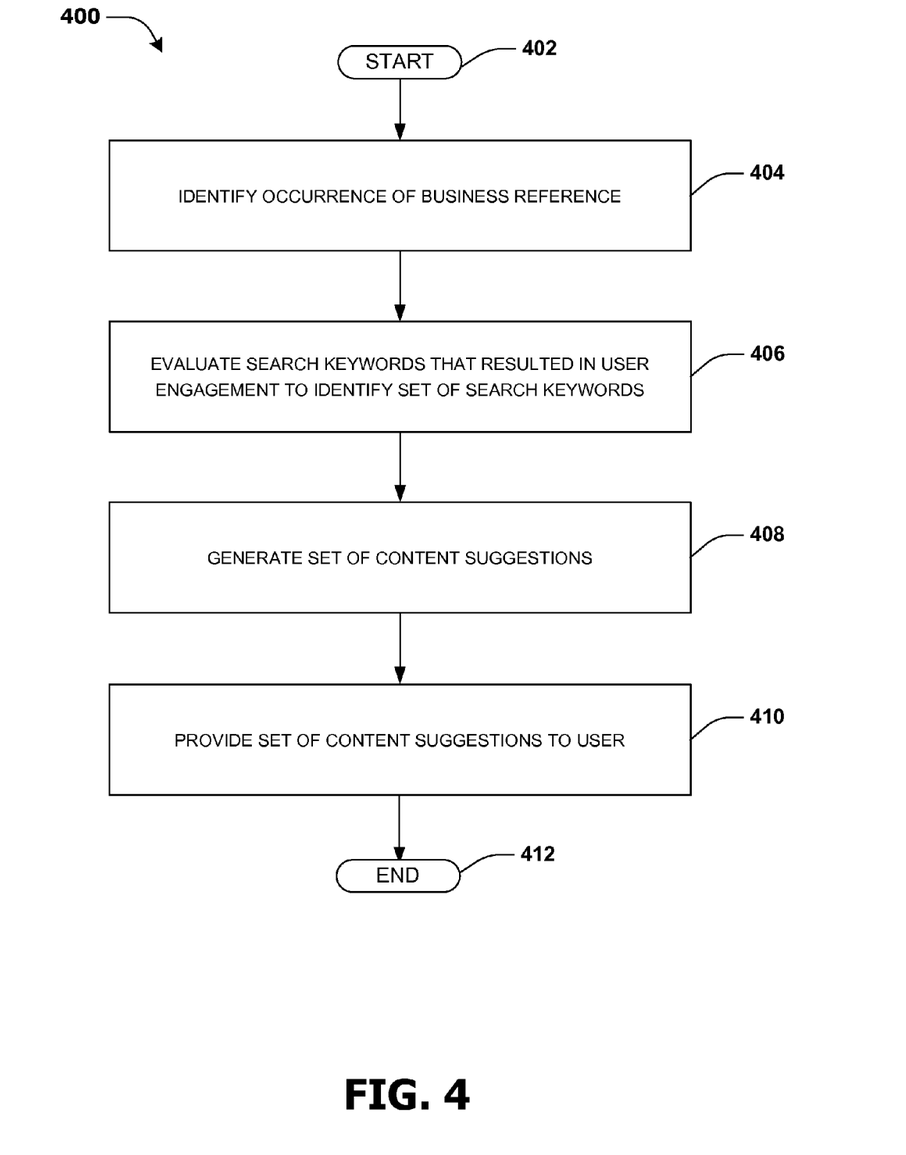
FIG. 4 is a flow chart illustrating an example method of providing content suggestions.

An embodiment of providing content suggestions is illustrated by an example method 400 of FIG. 4. At 402, the method starts. At 404, an occurrence of a business reference, of a business, associated with a user may be identified. In an example, a business name may be identified, within an email (e.g., the user may send an email to a spouse about visiting a grocery store after work), a chat message (e.g., the user may be chatting with a second user about visiting a car store), a social network post (e.g., the user may post about visiting a local ski shop), a question and/or answer associated with a question and answer service (e.g., the user may post a question regarding user opinions about a local electronics store), a search query, etc., as the business reference. For example, a user may submit a search query "the Akron Videogame Store", and the Akron Videogame Store may be identified as the business reference. The user may take affirmative action, such as providing opt-in consent, to allow access to and/or use of information (e.g., social network posts, calendar entries, photos, messages, search queries, etc.), such as for the purpose of identifying the business reference, identifying search keywords, and/or generating content suggestions (e.g., where a user responds to a prompt regarding the collection and/or use of such information).

At 406, search keywords that resulted in user engagement with the business may be evaluated to identify a set of search keywords having user engagement above a threshold. For example, "the Rad Racing Game", "wireless controller", "videogame console camera", "the Think Tank Strategy Game", and/or a plethora of other search keywords (e.g., submitted by users to a search engine) may have led users to visiting an Akron Videogame Store website or otherwise engaging with the Akron Videogame Store. Search keywords having user engagement above a threshold (e.g., a threshold number or percentage of users visited the Akron Videogame Store website after performing a search using the search keyword "the Rad Racing Game" compared to other search keywords) may be selected for inclusion within the set of search keywords (e.g., merely a few users visited the Akron Videogame Store website after performing a search using the search keyword "where to sell my games", and thus the search keyword may not be included within the set of search keywords). In an example, users may provide opt-in consent for various types of content, such as emails, social network posts, chat messages, calendar entries, etc., to be evaluated for identifying search keywords and/or generating content suggestions.

In an example, a temporal threshold may be defined based upon at least one of a business feature of the business (e.g., a videogame store business feature) or a search keyword feature of a search keyword (e.g., a videogame console feature). In an example, a first temporal threshold of 2 months may be defined because users may be interested in new videogames that came out within the last 2 months, and thus search keywords used within the last 2 months may correspond to fresh, popular, and/or trending content. In an example, a second temporal threshold of a holiday season may be defined because users may be interested in popular videogames that were popular during the holiday season, and thus search keywords used during the holiday season may correspond to fresh, popular, and/or trending content. In an example, a third temporal threshold of 5 years may be defined because users may be interested in the latest videogame consoles which may have an average lifespan on 5 years, and thus search keywords used within the last 5 years may correspond to fresh, popular, and/or trending videogame console content. One or more search keywords may be identified for inclusion within the set of search keywords based upon the temporal threshold.

At 408, a set of content suggestions may be generated based upon the set of search keywords. The set of content suggestions may correspond to a website link to a merchandise item (e.g., a link to the Rad Racing Game available from the Akron Videogame Store website or other merchandise website), a search query linking to a search query results interface (e.g., a link to a search results page for a search query "the Rad Racing Game"), an image of the merchandise item (e.g., an image of the Rad Racing Game), a description of the merchandise item (e.g., a summary about the Rad Racing Game), a map to a location of the merchandise item (e.g., directions to one or more stores that have the Rad Racing Game in stock), a coupon (e.g., a manufacturer coupon for the Rad Racing Game), an advertisement (e.g., for various videogames published by a publisher of the Rad Racing Game), a brand keyword (e.g., "Radicalness Games"), a merchandise keyword, a merchandise category (e.g., a racing videogame category), a user review for the merchandise item, a business user review (e.g., for the Akron Videogame Store), a business description, etc. In an example, the set of content suggestions may corresponds to multiple merchandise items (e.g., a coupon for the Rad Racing Game, a search query "Think Tank Strategy Game", an advertisement for a wireless controller, and/or other content associated with the set of search keywords).

In an example, one or more content suggestion may be identified for inclusion within the set of content suggestions based upon a user demographic of the user such as an age of the user (e.g., the user may be in an age range of users that are interest in racing games), a location of the user, a user interest of the user (e.g., the user may have expressed an interest in a particular videogame console manufacturer), a browsing history of the user (e.g., the user may have searched for wireless controllers), a purchase history of the user (e.g., the user may have purchased a particular videogame console that can play the Rad Racing Game), a social network profile of the user (e.g., the user may post that the user is excited for an upcoming release of the Rad Racing Game), a preference of the user, etc. In an example, content suggestions, within the set of content suggestions, may be ordered based upon an advertising revenue opportunity (e.g., a publisher of the Rad Racing Game may have a relatively high advertising budget for the Rad Racing Game), a user dwell time (e.g., users may spend relatively large amounts of time reading Rad Racing Game reviews), a click through rate (e.g., a threshold number of users that visited shopping webpages for the Rad Racing Game), a popularity metric, a trending metric (e.g., numerous users may have recently read Rad Racing Game reviews and/or microblogged about the Rad Racing Game), a user engagement metric, a financial metric, etc.

At 410, the set of content suggestions may be provided to the user (e.g., a Rad Racing Game search query, a wireless controller image and description, a videogame console coupon, a Space Ship Wars videogame review, etc.). In an example where the occurrence of the business reference corresponds to a search query of the user, the set of content suggestions may be displayed through a search interface for the search query. In an example where the occurrence of the business reference corresponds to an email associated with the user, the set of content suggestions may be displayed through an email interface. In an example where the occurrence of the business reference corresponds to a social network post associated with the user, the set of content suggestions may be displayed through a social network interface. In an example where the occurrence of the business reference corresponds to a chat message associated with the user, the set of content suggestions may be displayed through a chat message interface.

In an example, a content suggestion may be selected from the set of content suggestions to display to the user based upon payment from a business associated with the content suggestion and/or a contract to pay based upon user response to the content suggestion. For example, a business may pay (e.g., a flat monthly fee, a per-click payment, etc.) for the content suggestion to be displayed (e.g., where a click on the content suggestion may result in a map that displays how the user may find a merchandise item within a store associated with the business, as opposed to the click on the content suggestion resulting in a search results page for the merchandise item). In an example, the business may pay for a content suggestion interface element for the content suggestion to be shown such that a click on the content suggestion interface element leads to an online store of the business so long as the business has completed payment for the showing of the content suggestion interface element.

In an example, the set of content suggestions are displayed through a suggestion interface (e.g., a web browser user interface element, a panel of a website, an application user interface element, a mobile alert or notification, etc.). The suggestion interface may be populated with various functionality that may be invoked by the user. In an example, a save content suggestion interface element may be populated within the suggestion interface. The save content suggestion interface element may be used by the user to save and/or recall content suggestions. In an example, a share content suggestion interface element may be populated within the suggestion interface. The share content suggestion interface element may be used by the user to share a content suggestion with a second user, such as by email, text message, a chat message, a social network post, etc. In an example, a post to social network content suggestion interface element may be populated within the suggestion interface. The post to social network content suggestion interface element may be used by the user to post a content suggestion to a social network profile of the user.

In an example, the suggestion interface may follow the user, such as when the user transitions between various webpages. In this way, the user may access various content suggestions without transitioning back to an original webpage through which the suggestion interface was displayed. For example, the suggestion interface may be displayed with a first webpage, such as a search engine website. Responsive to receiving a selection of a content suggestion within the set of content suggestions (e.g., the user may select a content suggestion linking to a business website that sells a merchandise item corresponding to the content suggestion), a current user interface (e.g., a web browser) may be transitioned from displaying the first webpage to a second webpage, such as the business website, corresponding to the content suggestion. The suggestion interface may be displayed with the second webpage. In this way, the user may view, save, recall, and/or share content suggestions. At 412, the method ends.

Figure 5A:
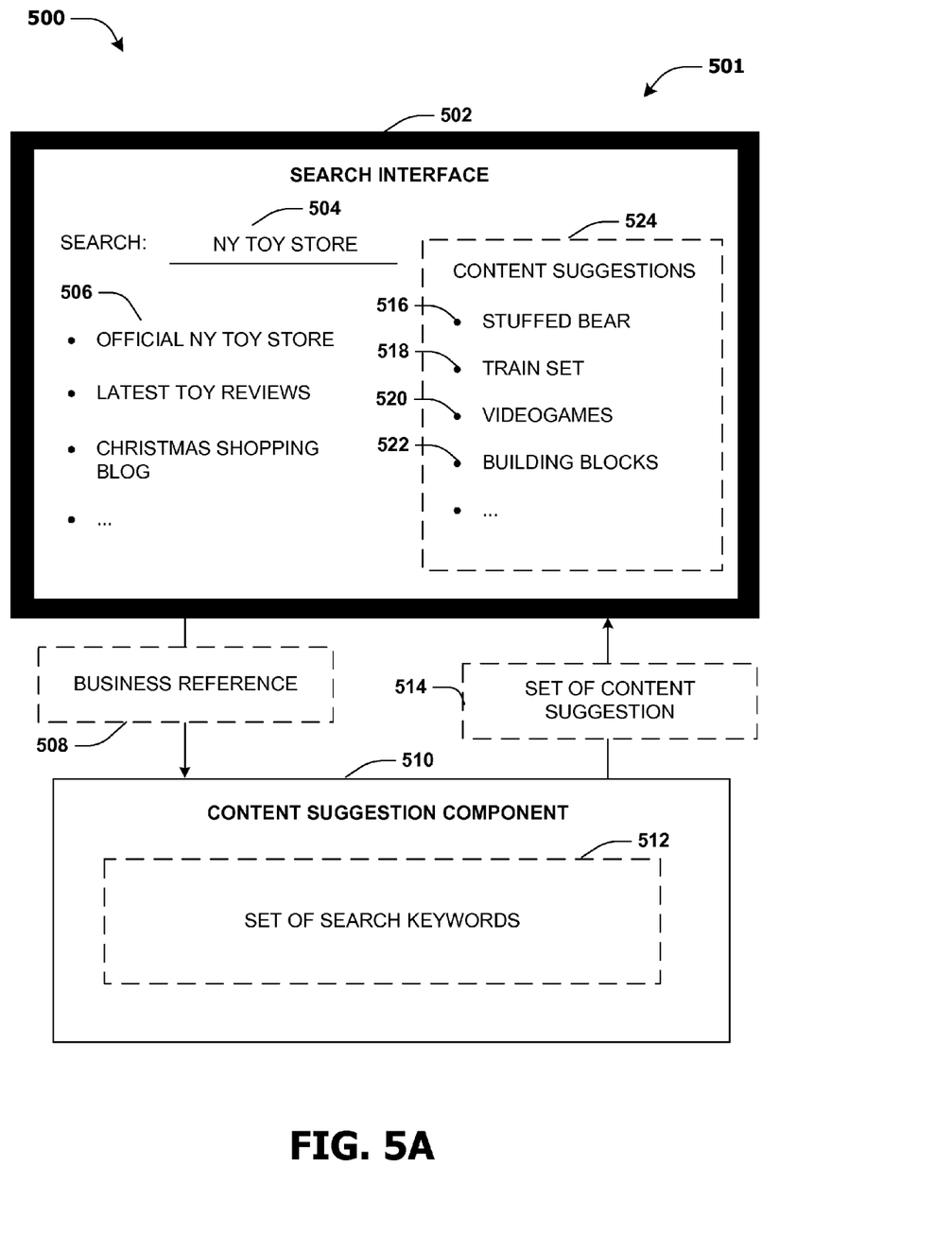
FIG. 5A is a component block diagram illustrating an example system for providing content suggestions associated with a search interface.

FIGS. 5A-5D illustrate examples of a system 501, comprising a content suggestion component 510, for providing content suggestions. FIG. 5A illustrates an example 500 of the content suggestion component 510 being associated with a client device that is displaying a search interface 502 to a user. The content suggestion component 510 may identify an occurrence of a business reference 508, of a business, associated with a search query 504 submitted by the user through the search interface 502 (e.g., the search interface 502 may display a search results page 506 comprising search results for the search query 504). For example, a NY Toy Store may be identified as the business reference 508 based upon the search query 504.

The content suggestion component 510 may evaluate search keywords that resulted in user engagement with the business to identify a set of search keywords 512 having user engagement above a threshold. For example, the set of search keywords 512 may comprise a stuffed bear search keyword, a train set search keyword, a videogames search keyword, a building blocks search keyword, and/or other search keywords, such as search queries, that led users to visit a NY Toy Store website, purchase a product from the NY Toy Store, view a social network profile of the NY Toy Store, and/or resulted in other user engagement with the NY Toy Store.

The content suggestion component 510 may generate a set of content suggestions 514 based upon the set of search keywords 512. For example, the set of content suggestions 514 may comprise a stuffed bear search query content suggestion 516, a train set merchandise keyword content suggestion 518, a videogames website link content suggestion 520, a building blocks website link content suggestion 522, and/or other various types of content suggestions (e.g., a map to stores that sell stuff bears). The set of content suggestions 514 may be provided to the user, such as through the search interface 502. For example, the set of content suggestions 514 may be populated within a suggestion interface 524 that is displayed with the search results page 506.

Figure 5B:
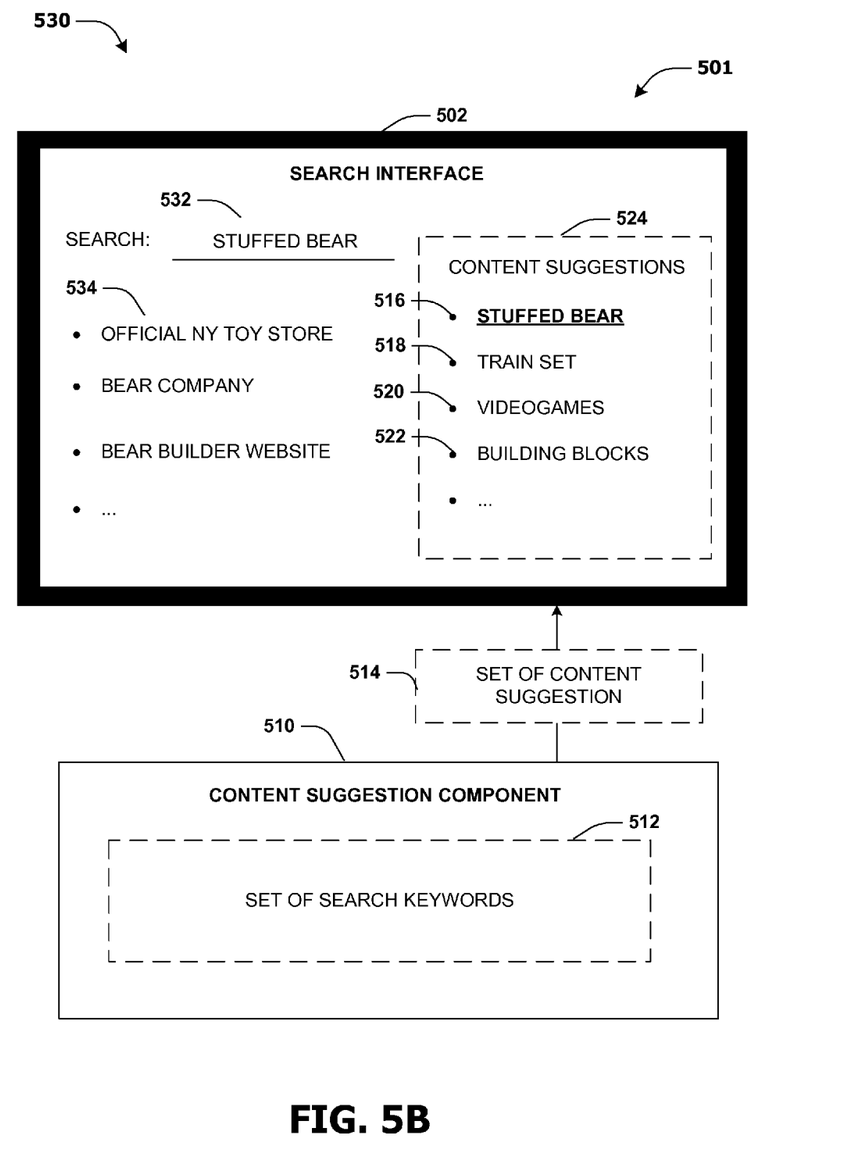
FIG. 5B is a component block diagram illustrating an example system for providing content suggestions associated with a search interface.

FIG. 5B illustrates an example 530 of the search interface 502 transitioning to a stuffed bear search results page 534 based upon the user invoking the stuffed bear search query content suggestion 516. For example, responsive to the user invoking the stuffed bear search query content suggestion 516, a stuffed bear search query 532 may be submitted through the search interface 502. The stuffed bear search results page 534 may be provided through the search interface 502 based upon the stuffed bear search query 532. The content suggestion component 510 may display the set of content suggestions 514 through the search interface 502, such as through the suggestion interface 524, with the stuffed bear search results page 534. In this way, the suggestion interface 524 may follow the user between search results pages, websites, and/or other content visited by the user on the client device.

Figure 5C:
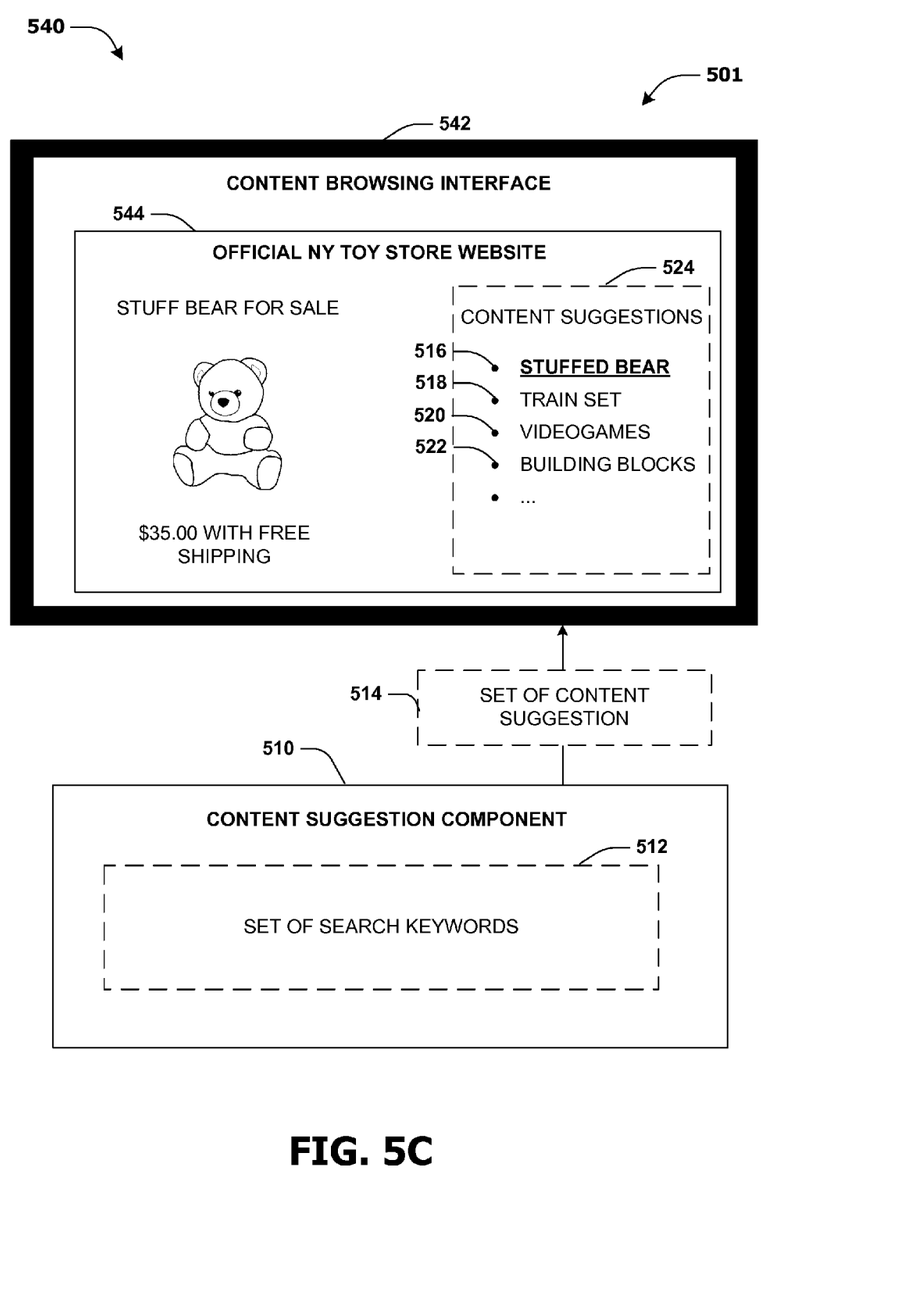
FIG. 5C is a component block diagram illustrating an example system for providing content suggestions associated with a content browsing interface.

FIG. 5C illustrates an example 540 of the client device transitioning from the search interface 502 to a content browsing interface 542 (e.g., a web browser) based upon the user selecting an official NY Toy Store search result from the stuffed bear search results page 534. The content suggestion component 510 may be configured to display the set of content suggestions 514 through the content browsing interface 542, such as through the suggestion interface 524, with an official NY Toy Store website 544 displayed by the content browsing interface 542. In this way, the suggestion interface 524 may follow the user between search results pages, websites, and/or other content visited by the user on the client device.

Figure 5D:
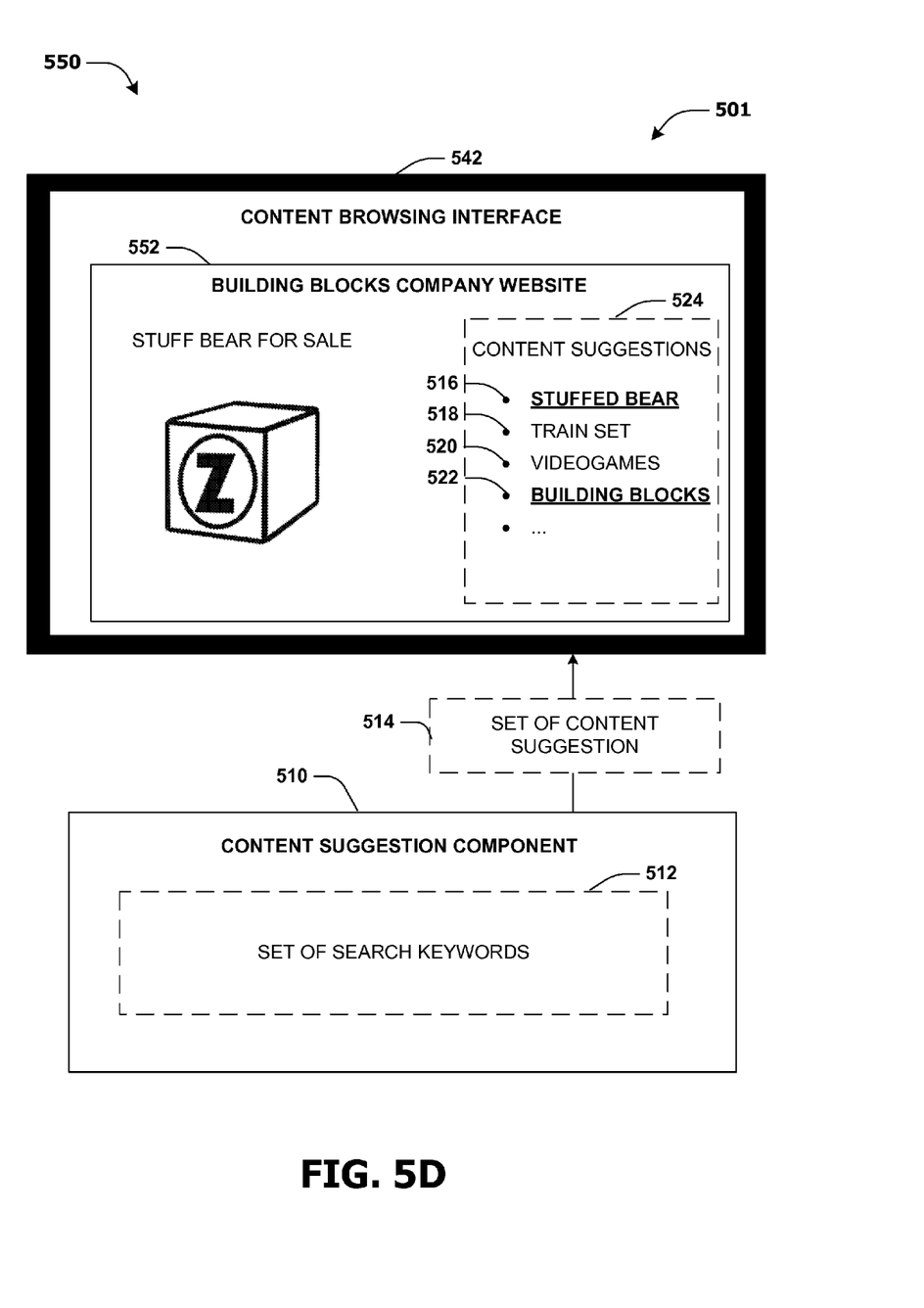
FIG. 5D is a component block diagram illustrating an example system for providing content suggestions associated with a content browsing interface.

FIG. 5D illustrates an example 550 of the content browsing interface 542 transitioning from the official NY Toy Store website 544 to a Building Blocks Company website 552 based upon the user invoking the building blocks search query content suggestion 522. The content suggestion component 510 may be configured to display the set of content suggestions 514 through the content browsing interface 542, such as through the suggestion interface 524, with the Building Blocks Company website 552. In this way, the suggestion interface 524 may follow the user between search results pages, websites, and/or other content visited by the user on the client device.

Figure 6:
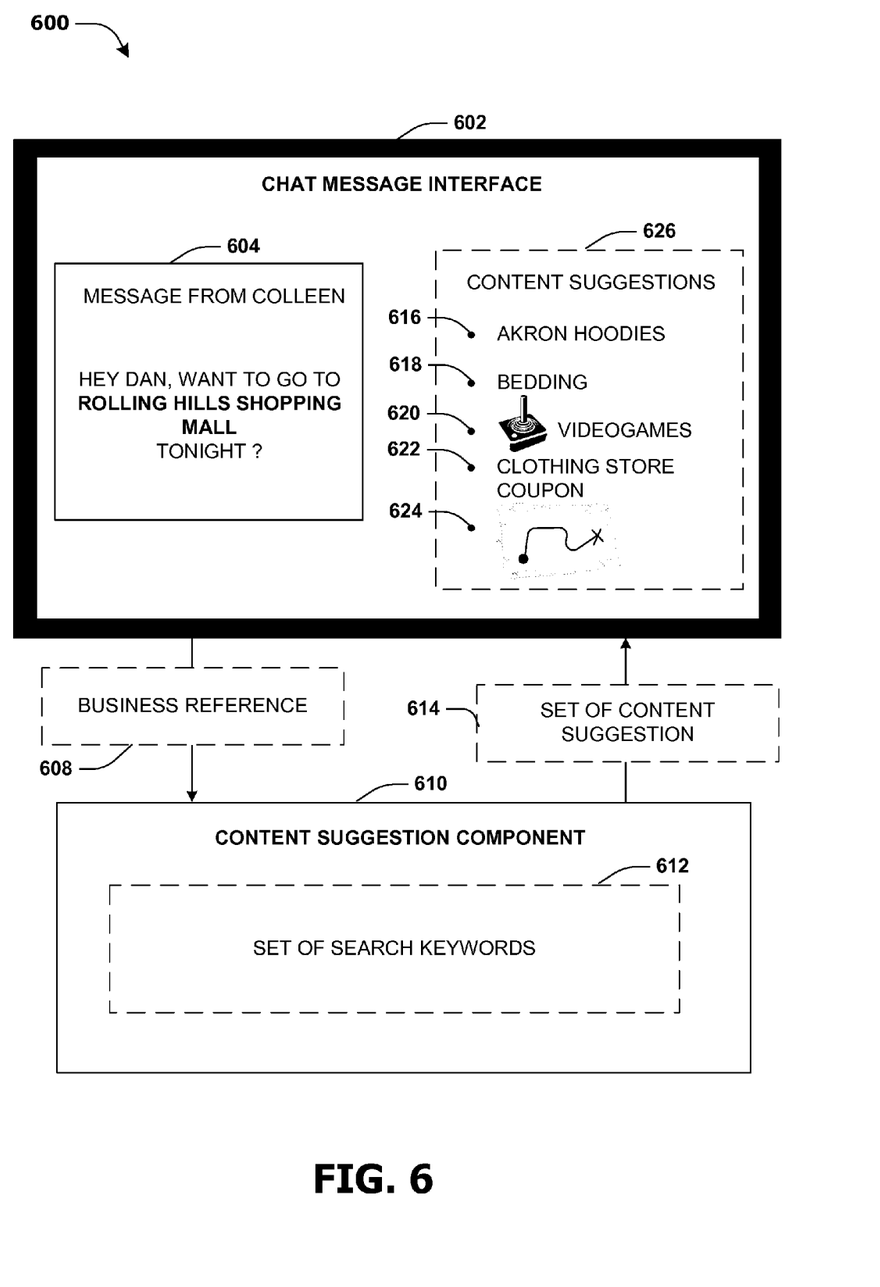
FIG. 6 is a component block diagram illustrating an example system for providing content suggestions associated with a chat message interface.

FIG. 6 illustrates an example of a system 600 for providing content suggestions. The system 600 comprises a content suggestion component 610 associated with a client device that is displaying a chat message interface 602 to a user. The content suggestion component 610 may identify an occurrence of a business reference 608, of a business, occurring within a chat message 604 associated with the chat message interface 602. For example, a Rolling Hills Shopping Mall may be identified as the business reference 608 based upon the chat message 604.

The content suggestion component 610 may evaluate search keywords that resulted in user engagement with the business to identify a set of search keywords 612 having user engagement above a threshold. For example, the set of search keywords 612 may comprise an Akron hoodies search keyword, a bedding search keyword, a videogames search keyword, a clothing search keyword, and/or other search keywords, such as search queries, that led users to visit a Rolling Hills Shopping Mall website, purchase a product from the Rolling Hills Shopping Mall, view a social network profile of the Rolling Hills Shopping Mall, and/or resulted in other user engagement with the Rolling Hills Shopping Mall.

The content suggestion component 610 may generate a set of content suggestions 614 based upon the set of search keywords 612. For example, the set of content suggestions 614 may comprise an Akron hoodies search query content suggestion 616, a bedding merchandise keyword content suggestion 618, a videogames image and description content suggestion 620, a clothing store coupon content suggestion 622, a map and directions content suggestion 624 to Rolling Hills Shopping Mall or another business that sells merchandise items associated with a search keyword, and/or other various types of content suggestions. The set of content suggestions 614 may be provided to the user, such as through the chat message interface 602. For example, the set of content suggestions 614 may be populated within a suggestion interface 626 that is displayed with the chat message 604.

Figure 7:
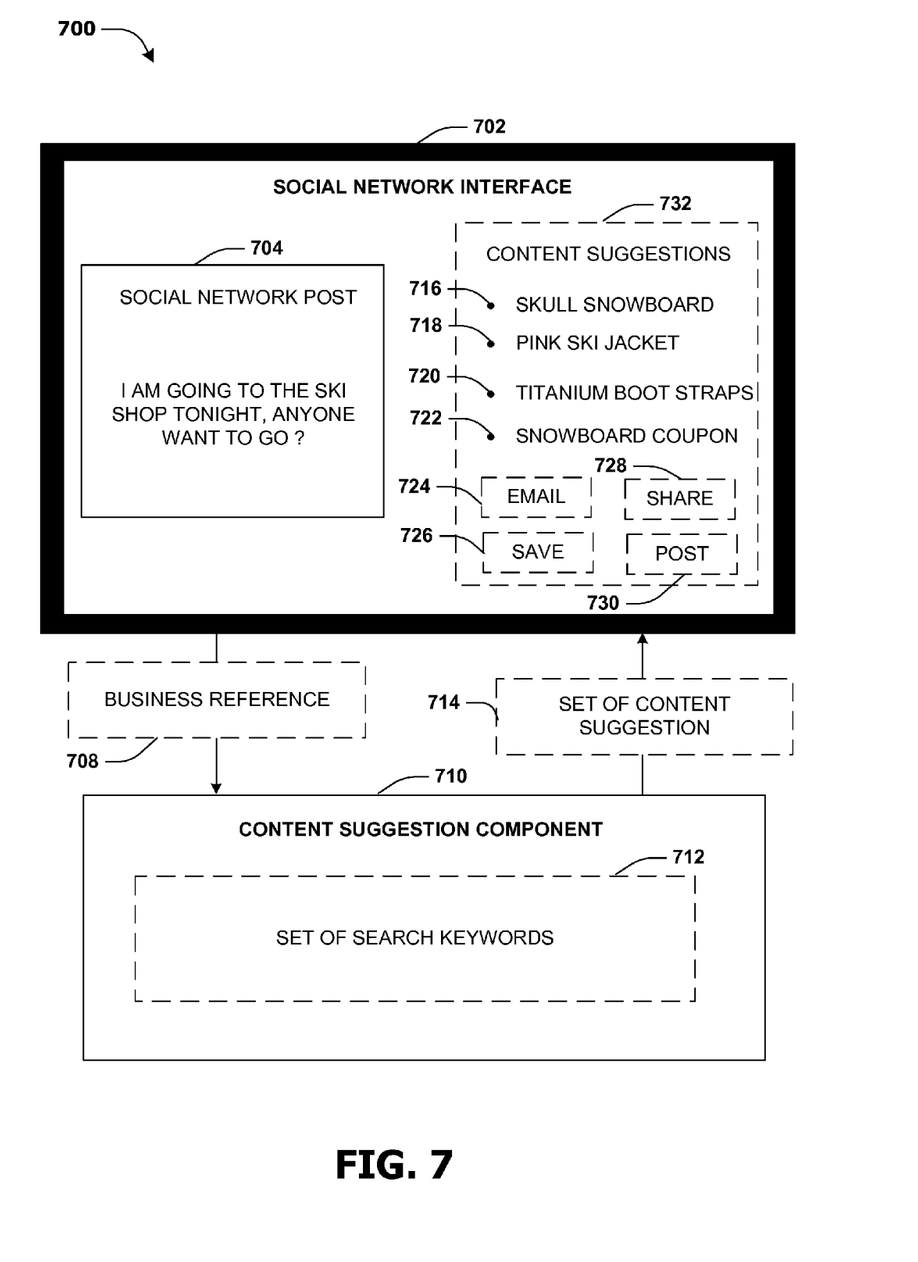
FIG. 7 is a component block diagram illustrating an example system for providing content suggestions associated with a social network interface.

FIG. 7 illustrates an example of a system 700 for providing content suggestions. The system 700 comprises a content suggestion component 710 associated with a client device that is displaying a social network interface 702 to a user. The content suggestion component 710 may identify an occurrence of a business reference 708, of a business, occurring within a social network post 704 associated with the social network interface 702. For example, a Ski Shop may be identified as the business reference 708 based upon the social network post 704.

The content suggestion component 710 may evaluate search keywords that resulted in user engagement with the business to identify a set of search keywords 712 having user engagement above a threshold. For example, the set of search keywords 712 may comprise a skull snowboard search keyword, a pink ski jacket keyword, a titanium boot straps search keyword, a snowboard search keyword, and/or other search keywords, such as search queries, that led users to visit a Ski Shop website, purchase a product from the Ski Shop, view a social network profile of the Ski Shop, and/or resulted in other user engagement with the Ski Shop.

The content suggestion component 710 may generate a set of content suggestions 714 based upon the set of search keywords 712. For example, the set of content suggestions 714 may comprise a skull snowboard search query content suggestion 716, a pink ski jacket keyword content suggestion 718, a titanium search query content suggestion 720, a snowboard coupon content suggestion 722, and/or other various types of content suggestions. The set of content suggestions 714 may be provided to the user, such as through the social network message interface 702. For example, the set of content suggestions 714 may be populated within a suggestion interface 732 that is displayed with the social network post 704. In an example, the suggestion interface 732 may be populated with an email content suggestion interface element 724 (e.g., used to send an email of a content suggestion to a user), a save content suggestion interface element 726 (e.g., used to save and/or recall a content suggestion), a share content suggestion interface element 728 (e.g., used to share a content suggestion with a second user), and/or a post to social network content suggestion interface element 730 (e.g., used to post a content suggestion to a social network profile).

Figure 8:
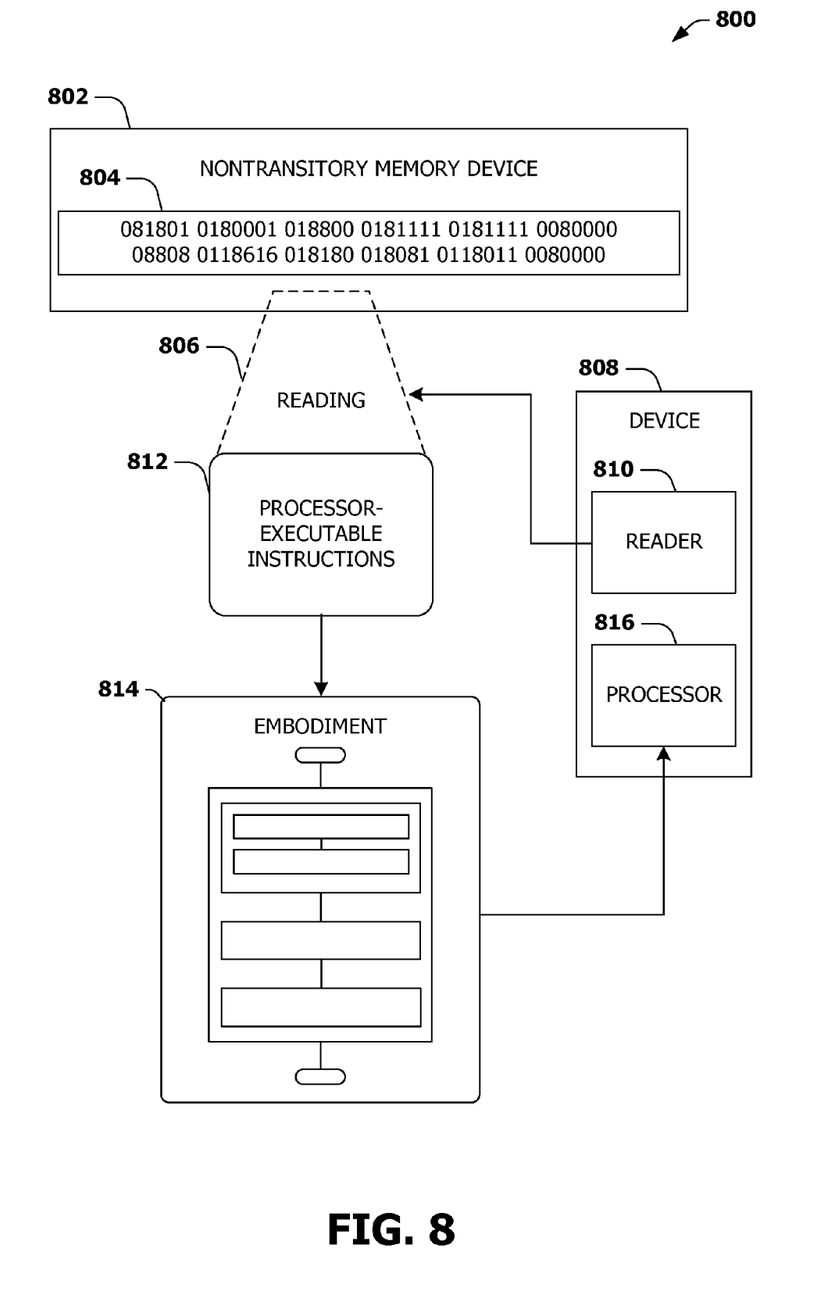
FIG. 8 is an illustration of a scenario featuring an example nontransitory memory device in accordance with one or more of the provisions set forth herein.

FIG. 8 is an illustration of a scenario 800 involving an example nontransitory memory device 802. The nontransitory memory device 802 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 802 stores computer-readable data 804 that, when subjected to reading 806 by a reader 810 of a device 808 (e.g., a read head of a hard disk drive, or a read operation invoked on a solid-state storage device), express processor-executable instructions 812. In some embodiments, the processor-executable instructions, when executed on a processor 816 of the device 808, are configured to perform a method, such as at least some of the example method 400 of FIG. 4, for example. In some embodiments, the processor-executable instructions, when executed on the processor 816 of the device 808, are configured to implement a system, such as at least some of the example system 501 of FIGS. 5A-5D, at least some of the example system 600 of FIG. 6, and/or at least some of the example system 700 of FIG. 7, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for providing content suggestions, comprising:
    identifying an occurrence of a business reference, of a business, in a first search result among a plurality of search results identified for a search query of a user, the first search result corresponding to a business website of the business;
    evaluating, using a processor, search keywords that resulted in user engagement with the business via the business website to identify a set of search keywords, comprising a first search keyword and a second search keyword, having user engagement, with the business via the business website, above a threshold, the first search keyword and the second search keyword different than the search query;
    determining a set of merchandise items available on the business website, comprising a first merchandise item corresponding to the first search keyword and a second merchandise item corresponding to the second search keyword, based upon the set of search keywords;
    generating a set of content suggestions, comprising a first content suggestion corresponding to a first link to the first merchandise item on the business website and a second content suggestion corresponding to a second link to the second merchandise item on the business website, based upon the set of merchandise items; and
    providing the set of content suggestions for display via an interface to the user.

2. The method of claim 1, the evaluating search keywords comprising:
    defining a temporal threshold based upon at least one of a business feature of the business or a search keyword feature of a search keyword; and
    identifying one or more search keywords for inclusion within the set of search keywords based upon the temporal threshold.

3. The method of claim 1, the set of content suggestions comprising a third content suggestion comprising a link corresponding to a second search query comprising a third search keyword of the set of search keywords.

4. The method of claim 1, the generating a set of content suggestions comprising:
    identifying one or more content suggestions, for inclusion within the set of content suggestions, based upon at least one of a user demographic of the user, a location of the user, a user interest of the user, a browsing history of the user, a purchase history of the user, a social network profile of the user, or a preference of the user.

5. The method of claim 1, the providing the set of content suggestions comprising:
    displaying the set of content suggestions through a search result interface for the search query.

6. The method of claim 1, the occurrence of the business reference corresponding to an email associated with the user, and the providing the set of content suggestions comprising:
    displaying the set of content suggestions through an email interface.

7. The method of claim 1, the occurrence of the business reference corresponding to a social network post associated with the user, and the providing the set of content suggestions comprising:
    displaying the set of content suggestions through a social network interface.

8. The method of claim 1, the occurrence of the business reference corresponding to a chat message associated with the user, and the providing the set of content suggestions comprising:
    displaying the set of content suggestions through a chat message interface.

9. The method of claim 1, the set of content suggestions comprising at least one of a website link to a merchandise item, a search query linking to a search query results interface, an image of the merchandise item, a description of the merchandise item, a map to a location of the merchandise item, a coupon, an advertisement, a brand keyword, a merchandise keyword, a merchandise category, a user review for the merchandise item, a business user review, or a business description.

10. The method of claim 9, comprising:
determining whether to display a content suggestion from the set of content suggestions based upon at least one of payment from a business associated with the content suggestion or a contract to pay that is based upon user response to the content suggestion.

11. The method of claim 1, the providing the set of content suggestions comprising:
displaying the set of content suggestions through a suggestion interface; and
populating the suggestion interface with a save content suggestion interface element configured to save a content suggestion.

12. The method of claim 1, the providing the set of content suggestions comprising:
displaying the set of content suggestions through a suggestion interface; and
populating the suggestion interface with a share content suggestion interface element configured to share a content suggestion with a second user.

13. The method of claim 1, the providing the set of content suggestions comprising:
displaying the set of content suggestions through a suggestion interface; and
populating the suggestion interface with a post to social network content suggestion interface element configured to post a content suggestion to a social network profile of the user.

14. The method of claim 1, comprising:
displaying the set of content suggestions through a suggestion interface displayed with a first webpage; and
responsive to receiving a selection of a content suggestion within the set of content suggestions:
transitioning a current user interface from the first webpage to a second webpage corresponding to the content suggestion; and
displaying the suggestion interface with the second webpage.

15. The method of claim 14, the first webpage corresponding to a search results page of a search engine website, and the second webpage corresponding to a business website that sells a merchandise item corresponding to the content suggestion.

16. A system for providing content suggestions, comprising:
a processor; and
memory comprising processor-executable instructions that when executed by the processor cause implementation of a content suggestion component configured to:
identify an occurrence of a business reference, of a business, associated with a user;
evaluate search keywords that resulted in user engagement with the business to identify a set of search keywords, comprising a first search keyword and a second search keyword, having user engagement, with the business, above a threshold;
determine a set of merchandise items available via the business, comprising a first merchandise item corresponding to the first search keyword and a second merchandise item corresponding to the second search keyword, based upon the set of search keywords;
generate a set of content suggestions, comprising a first content suggestion corresponding to a first link to the first merchandise item and a second content suggestion corresponding to a second link to the second merchandise item, based upon the set of merchandise items, at least one of the first link or the second link associated with the business; and
provide the set of content suggestions for display via an interface to the user.

17. The system of claim 16, the content suggestion component configured to:
display the set of content suggestions through a suggestion interface; and
populate the suggestion interface with at least one of a save content suggestion interface element configured to save a content suggestion, a share content suggestion interface element configured to share the content suggestion with a second user, or a post to social network content suggestion interface element configured to post the content suggestion to a social network profile of the user.

18. The system of claim 16, the content suggestion component configured to:
display the set of content suggestions through at least one of a search result interface for the search query, an email interface, a social network interface, or a chat message interface.

19. The system of claim 16, the content suggestion component configured to:
order content suggestions, within the set of content suggestions, based upon at least one of an advertising revenue opportunity, a user dwell time, a click through rate, a popularity metric, a trending metric, a user engagement metric, or a financial metric.

20. A non-transitory computer readable medium comprising computer executable instructions that when executed by a processor perform a method for providing content suggestions, comprising:
receiving a search query, associated with a user, comprising a business reference of a business;
evaluating, using a processor, search keywords that resulted in user engagement with the business to identify a set of search keywords, comprising a first search keyword and a second search keyword, having user engagement, with the business, above a threshold;
determining a set of merchandise items available via the business, comprising a first merchandise item corresponding to the first search keyword and a second merchandise item corresponding to the second search keyword, based upon the set of search keywords;
generating a set of merchandise item suggestions, comprising a first merchandise item suggestion corresponding to a first link to the first merchandise item sold by the business and a second merchandise item suggestion corresponding to a second link to the second merchandise item sold by the business, based upon the set of merchandise items; and
concurrently providing the set of merchandise item suggestions and a first search result corresponding to a business website of the business for display via an interface to the user.

* * * * *